US005756187A

United States Patent [19]

Kuo et al.

[11] Patent Number: 5,756,187

[45] Date of Patent: May 26, 1998

[54] WRITING SYSTEM OF STACKED CARBONLESS, REPOSITIONABLE SELF-ADHESIVE PAPER

[75] Inventors: Tsung-Tien Kuo, Kaohsiung Hsien; Hsieh-Chang Hsieh; Hsien-Min Kuo, both of Kaohsiung, all of Taiwan

[73] Assignee: Taiwan Hopax Chemical Mfg., Co., Ltd., Kaohsiung, Taiwan

[21] Appl. No.: 694,639

[22] Filed: Aug. 7, 1996

[51] Int. Cl.$^{6}$ .......... B32B 3/00

[52] U.S. Cl. .......... 428/195; 428/40.1; 428/194; 428/321.5; 428/411.1; 428/500; 427/212; 156/60; 503/206; 503/226

[58] Field of Search .......... 428/195, 411.1, 428/93, 401, 194, 321.5, 500; 503/206, 226; 283/74, 101; 427/212; 156/60

[56] References Cited

U.S. PATENT DOCUMENTS

| | | | |
|---|---|---|---|
| 4,714,276 | 12/1987 | Greig | 283/63 R |
| 4,720,479 | 1/1988 | Craig et al. | 503/200 |
| 4,798,401 | 1/1989 | Greig | 282/9 R |
| 5,109,083 | 4/1992 | Hsieh et al. | 524/733 |
| 5,194,329 | 3/1993 | Hsieh et al. | 428/332 |
| 5,334,094 | 8/1994 | Armbruster et al. | 462/17 |
| 5,352,648 | 10/1994 | Chao | 503/206 |

FOREIGN PATENT DOCUMENTS

| | | | |
|---|---|---|---|
| 0281344A2 | 2/1988 | European Pat. Off. | B41L 1/24 |
| 0325057A2 | 12/1988 | European Pat. Off. | B42D 5/00 |
| 0486127A1 | 5/1991 | European Pat. Off. | B41L 1/24 |

*Primary Examiner*—William Krynski
*Attorney, Agent, or Firm*—Hamilton, Brook, Smith and Reynolds, P.C.

[57] ABSTRACT

This invention pertains to a carbonless copying system for making multiple copies of a message, comprising a plurality of carbonless paper sheets of which each sheet of carbonless paper comprises a region of removable, repositionable pressure sensitive adhesive on the back surface of the sheet. The method for manufacturing the removable and repositionable pressure sensitive carbonless copying system and their use for making multiple copies of a message are also described.

20 Claims, 4 Drawing Sheets

WRITING SYSTEM OF STACKED CARBONLESS, REPOSITIONABLE SELF-ADHESIVE PAPER

BACKGROUND OF THE INVENTION

Efforts have been made to provide office supplies which can reduce the input time for a particular writing/copying task. Carbonless copying paper was developed to achieve this objective and has been used in business forms and multi-sheet note pads, for example. Since its introduction, carbonless copying paper has been modified to develop additional products for multi-copying tasks.

U.S. Pat. No. 5,352,648, issued to Chao, describes a pressure sensitive copying paper with repositionable adhesive properties. The copying system includes a plurality of stacked sheets of paper which are temporarily attached to each other with a pressure sensitive adhesive. The pressure sensitive adhesive is applied onto the paper's surface as a mixture of adhesive and carbonless microcapsules. The problem with this configuration is that the manufacturer must make the carbonless paper rather than use pre-made carbonless paper from another manufacturer. This translates into additional materials and manufacturing costs and downstream product costs for the consumer.

Combining the concepts of repositionable adhesives and carbonless coatings into a commercially acceptable product is desirable.

SUMMARY OF THE INVENTION

This invention pertains to a carbonless copying system for making multiple copies of a message, comprising a plurality of carbonless paper sheets of which each sheet of carbonless paper comprises a region of removable, repositionable pressure sensitive adhesive on the back surface of the sheet. The method for manufacturing the removable and repositionable pressure sensitive carbonless copying system and their use for making multiple copies of a message are also described. The copying system can be a note pad, multi-part business form or the like but for clarity of discussion throughout this application, the note pad format will be discussed to illustrate the invention, but in no way does it limit the scope of the invention.

In one embodiment, a two-part carbonless copying system comprises: a) a first sheet of paper having front and back surfaces, said back surface comprising a layer of a carbonless copying component, a layer of resin coated on a portion of the copying component and a layer of a removable and repositionable pressure sensitive adhesive coated upon the resin, wherein the resin masks the carbonless copying component from the adhesive; and b) a second sheet of paper having front and back surfaces, said front surface comprising a layer of a carbonless image transfer material for cooperation with said carbonless copying component to enable an image to be transferred to said second sheet upon application of localized pressure to said first sheet and wherein said first sheet is temporarily adhered to said second sheet by the pressure sensitive adhesive component. The second sheet of paper can optionally comprise a layer of removable and repositionable pressure sensitive adhesive on at least a portion of the back surface.

In another embodiment, a multi-part carbonless copying system comprises: a) a first sheet of paper having front and back surfaces, said back surface comprising a layer of a carbonless copying component, a layer of resin coated on a portion of the copying component and a layer of a removable and repositionable pressure sensitive adhesive coated upon the resin, wherein the resin masks the carbonless copying component from the adhesive; b) at least one second sheet of paper having front and back surfaces, said front surface comprising a layer of a carbonless image transfer material for cooperation with carbonless copying component of said first sheet, and said back surface comprising a layer of carbonless copying component, a layer of resin coated on a portion of the copying component and a layer of a removable and repositionable pressure sensitive adhesive coated upon the resin, wherein the resin masks the carbonless copying component from the adhesive; and c) a third sheet of paper having front and back surfaces, said front surface comprising a layer of a carbonless image transfer material for cooperation with said carbonless copying component on the second sheet, wherein the sheets are temporarily adhered together in a stacked configuration by the pressure sensitive adhesive.

In a preferred embodiment, a note pad or multi-part copying system comprises a plurality of stacked sheets of carbonless copying paper, each sheet of paper having an front surface comprising a carbonless image transfer material and a back surface comprising a layer of a carbonless copying component, a layer of resin coated on the copying component and a layer of a removable and repositionable pressure sensitive adhesive coating thereon; wherein the carbonless image transfer material on the front surface of each sheet is in cooperation with said carbonless coating component on the adjoining sheet in the stack to enable an image to be transferred to the adjoining sheet upon application of localized pressure to the front surface, wherein said sheets are temporarily adhered together in the stack by said pressure sensitive adhesive.

The writing system can be produced by a method comprising the steps of: a) providing a sheet of carbonless copying paper having a front surface coated thereon with a carbonless image transfer material and a back surface coated thereon with a carbonless copying component; b) coating at least a portion of said back surface with a resin; c) coating the resin portion on the back surface of the sheet with a layer of removable, repositionable, pressure sensitive adhesive; and d) assembling a plurality of sheets obtained in step (c) into a stack such that the back surface of one sheet is in contact with the front surface of the adjoining sheet in the stack; wherein said sheets are temporarily adhered together in the stack by said pressure sensitive adhesive, thereby forming the removable and repositionable pressure sensitive carbonless copying system. The writing system can further comprise on the front surface of each sheet, a layer of resin applied to the region on the surface that contacts the adhesive on the adjoining sheet.

The note pads can be used to make multiple copies of a single message, of which each copy can be attached to any desired object, removed and repositioned without damaging the surface of the object. The note pad further enables an author to pre-select the number of copies of a message to be made, by removing the desired number of paper sheets from the stack before the message is written.

DETAILED DESCRIPTION OF THE INVENTION

Figure 1:
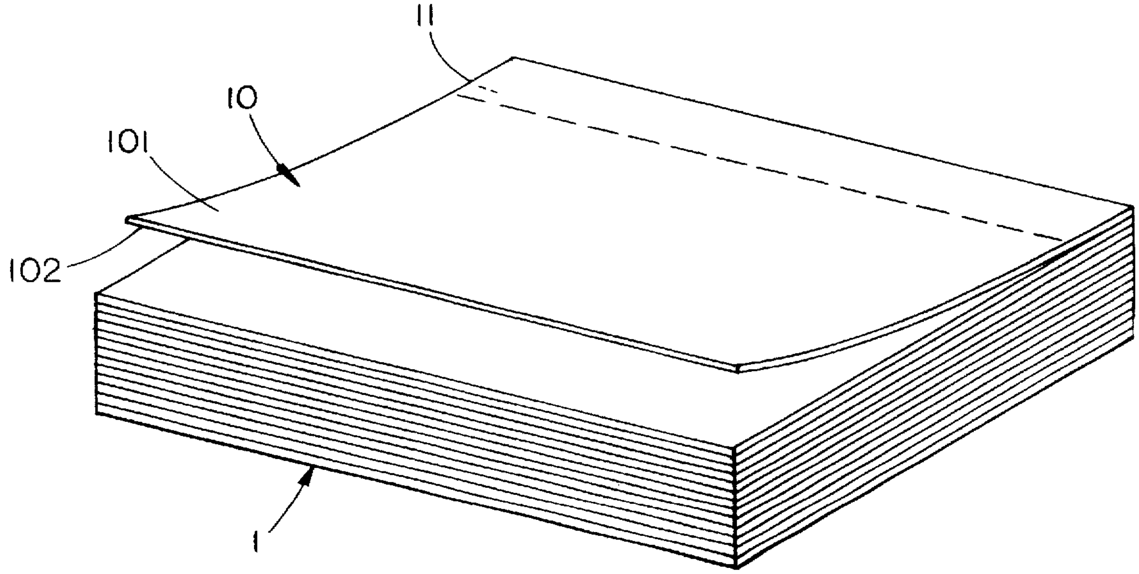
FIG. 1 is a perspective view of a stack of the carbonless, repositionable self-adhesive note paper.

The invention provides a writing system comprising a plurality of carbonless, repositionable self-adhesive note paper which is stacked and a method of manufacturing the writing system, such as stacked note paper. The invention provides a method for making copies from a single written message. The invention is further described by the drawings, which in no way are intended to limit the invention to the embodiments illustrated in the drawings provided herein.

Figure 2:
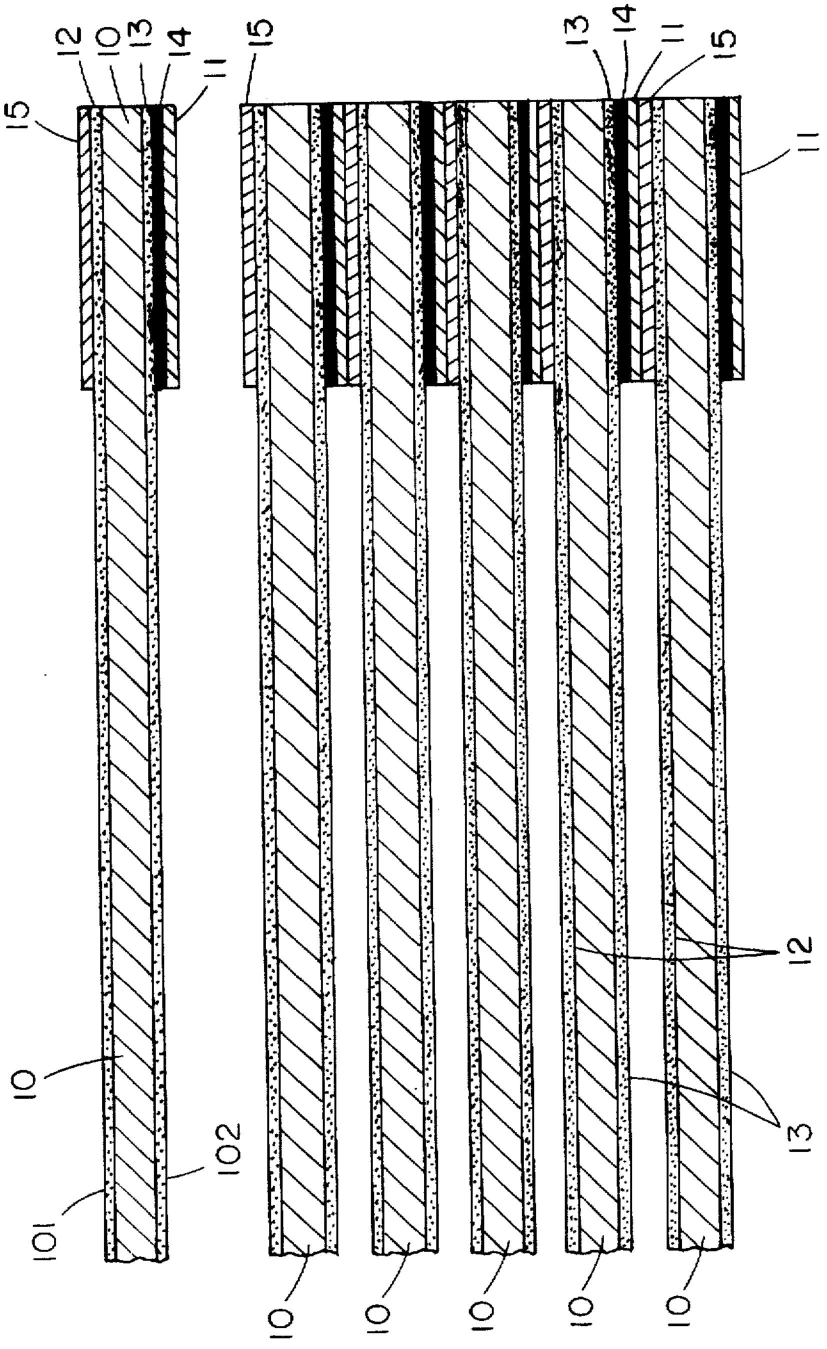
FIG. 2 is a cross-sectional view of the note paper stack shown in FIG. 1.

In one embodiment, as shown in FIG. 1, a stack of note paper 1 (herein referred to as "note pad") comprises a plurality of individual carbonless copying paper sheets 10 which are secured along one marginal edge 11 on the underside 102 of each sheet 10 with a resin 14 and a removable, repositionable pressure sensitive adhesive thereon (shown in FIG. 2).

FIG. 2 shows a detailed cross-sectional view of the note pad illustrated in FIG. 1. The front surface 101 of each sheet comprises a layer of color developer 12 and the back surface 102 of each sheet comprises a layer of microencapsulated dye 13. Both the front surface 101 and the back surface 102 of each sheet 10 further comprises a layer of resin 15 and 14, respectively, coated on a portion of the sheet. A pressure sensitive adhesive 11 layer is then applied onto the resin 14. The resin and adhesive are placed on a portion of the sheet back surface 102, such as in the form of a strip at one end of the sheet which can preferably be the top or side of the note pad. The layer of resin 15 on the front surface 101 of sheet 10 is however optional and preferably applied only to the region that will come into contact with the pressure sensitive adhesive 11 on the back surface 102 of the adjacent sheet of paper in a note pad configuration.

Figure 3:
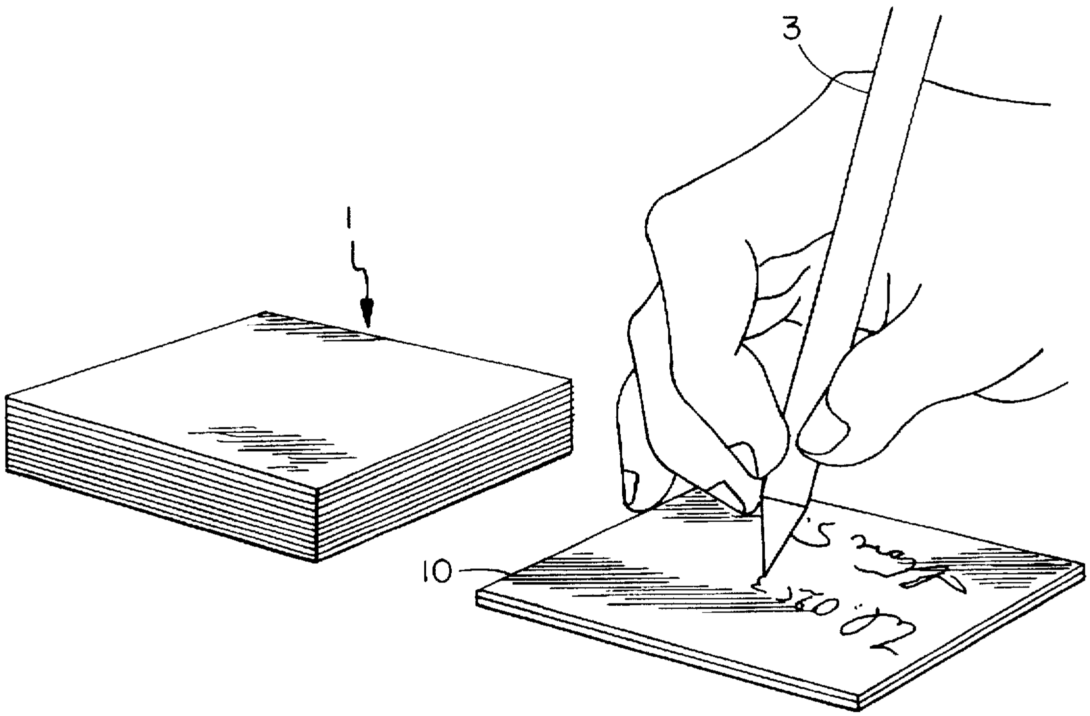
FIG. 3 illustrates the use of the note pad whereby several sheets of note paper are removed from the stack and copies are generated.
Figure 4:
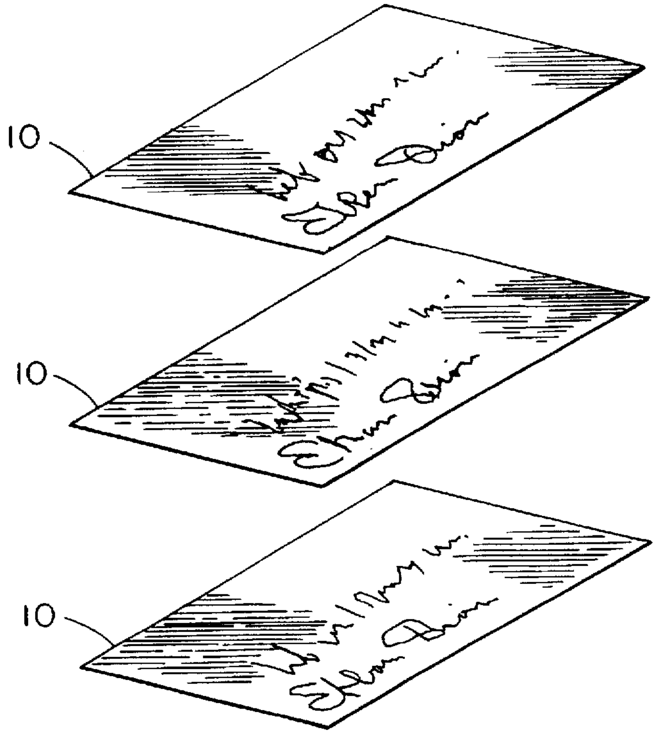
FIG. 4 illustrates the product generated as shown in FIG. 3 whereby three copies are made.

Sheets of carbonless paper can be removed from the note pad individually or in groupings that corresponds to the desired number of copies. FIGS. 3 and 4 illustrate this concept where three sheets of note paper 10 are selected from note pad 1. A single writing event on the uppermost pre-selected sheet 10 results in an original and two copies (FIG. 4). Each sheet of copying paper can be repositioned onto another surface such as, but not limited to, paper, fabric, wood, plaster, metal, or other surface material. Each sheet of paper that comprises the note pad is preferably obtained from a stock of pre-made conventional carbonless copying paper and then further processed by coating at least a portion of the back surface of the paper with a resin and then with a removable and repositionable pressure sensitive adhesive. Optionally, the front surface of the paper is coated with a resin, wherein the portion corresponds to the position of the adhesive strip on the back surface of the adjacent sheet when it is stacked into a note pad. The purpose of the resin is to mask the carbonless copying components of the paper from the adhesive. Such masking will avoid contamination of the adhesive which could reduce adhesive performance under storage conditions, for example. Once the individual sheets are made, they are cut and piled into pads in any amount depending upon intended use. Techniques for assembly into note pads, business forms or other similar products are well known in the industry.

The terms "repositionable" and "repositioned" are intended herein to mean a sheet of paper which has an adhesive thereon which can be temporarily attached to one surface, removed from the surface without damaging the integrity of the surface from which it is removed and then adhered to another surface of similar or different material.

Any adhesive which meets the repositionable definition provided herein can be used. Preferred examples of "repositionable" adhesives that can be used in this invention have been described in U.S. Pat. Nos. 5,109,083 and 5,194,329, the teachings of which are incorporated by reference herein in their entirety. These patents describe the preparation and use of inherent tacky, elastomeric, solvent-insoluble, solvent-dispersible polymeric microparticles by aqueous emulsion polymerization. A preferred type of adhesive is an acrylate repositionable adhesive. The size of the adhesive area will be dictated by the size of the sheet of note paper but in any event the adhesive area should be large enough to adequately adhere the paper to a surface. The configuration of adhesive on the sheets can be varied according to design preference. However, the preferred location to the adhesive will be along one marginal edge of the paper as illustrated in FIG. 2.

Conventional carbonless copying paper typically comprises a layer of microcapsules (also referred to herein as the carbonless copying component) which contain an encapsulated solvent, and soluble dye (e.g., Leuco Dye in solvent) on the back surface 102 of the note paper. Any carbonless paper and its technology can be used. This surface is defined as "coated back" or "CB" paper. A layer of color developing material (also referred to herein as carbonless image transfer material), such as phenolic resin, active clay or salicylic type resins, is applied onto the front surface 101 of a continuous sheet of note paper such that it is in contact with the "CB" paper. This coated surface is defined as "coated front" or "CF". A composite sheet of paper containing both "CF" and "CB" is referred to as a "coated front and back" or "CFB". Typical carbonless copying systems include a combination of adjacent cooperating CB and CF layers on adjacent sheets. For example, the bottom surface of the top sheet is typically coated with carbonless microcapsules (the CB coating or layer) which burst upon the application of localized pressure, to transfer an image onto a resinous or clay coating (the CF coating or layer) provided on the top surface of a lower adjacent sheet. Other arrangements include a combined CFB coating on the top surface of the lower sheet, resulting in image transferal to the lower sheet upon original writing pressure applied to the top surface of the upper sheet.

Figure 5:
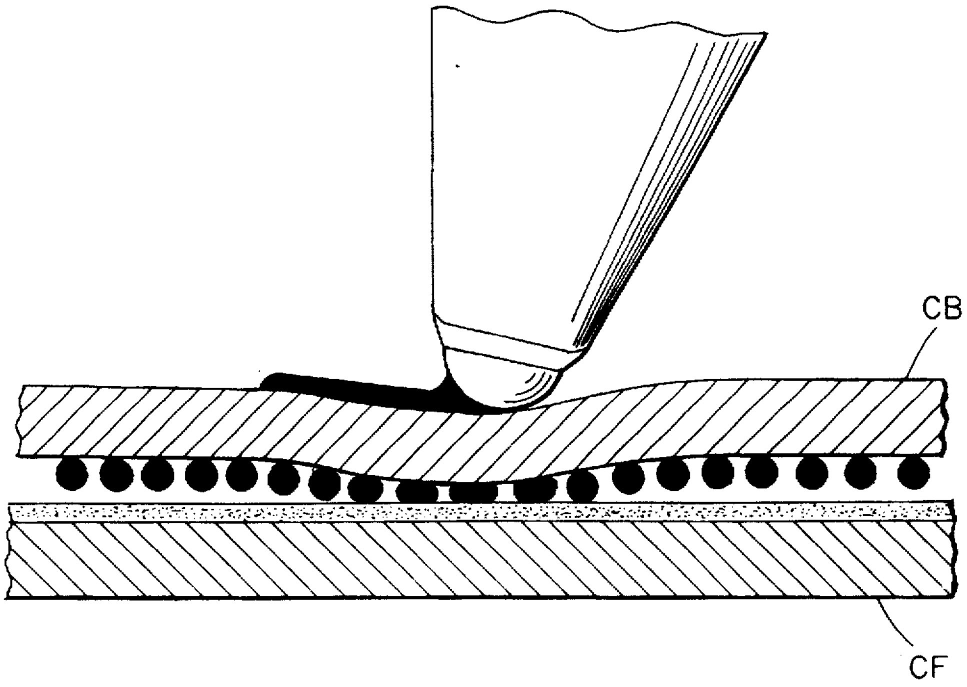
FIG. 5 is an expanded view of an illustration of two sheets of note paper of this invention when writing pressure is applied to the surface of the note paper.
Figure 6:
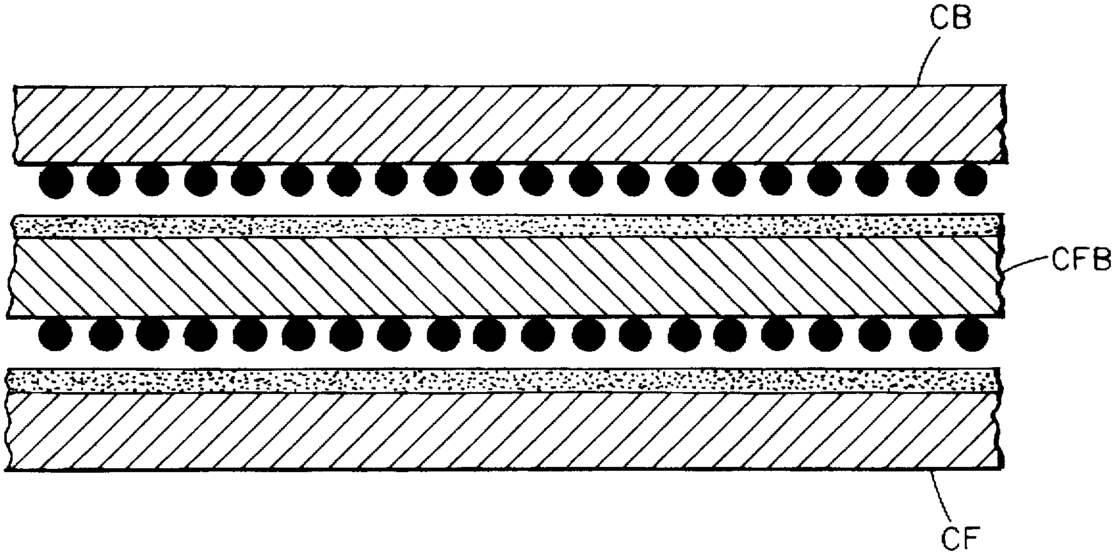
FIG. 6 is an expanded view of three sheets of carbonless, repositionable self-adhesive note paper.

As shown in FIG. 5, by writing on the top of the first sheet, the pressure of the writing pen ruptures the microcapsule on the "CB", thus causing the dye to squeeze out. The dye reacts with the "CF" paper's color developer. The chemical reaction results in an image of the written message. In one embodiment, when a plurality of note paper is stacked into a note pad configuration, the first sheet in the stack is a CB paper. The bottom sheet is a CF paper and the plurality of note paper there between will be CFB paper. Although it is not essential that the first and last of the note pad be CB and CF paper, respectively, this configuration may be preferred for the manufacture of business forms where only a predetermined number of copies are desired. FIG. 6 demonstrates this configuration where one sheet of CFB paper is placed between the CB and CF sheets. Additional sheets of CFB paper can be placed between the CB and CF sheets if more copies beyond that provided in the pad is needed.

In a preferred embodiment, the note pad will comprise a plurality of stacked CFB paper where the first and last sheet of paper in each stack is also CFB paper. This embodiment is preferred from a commercial manufacturing stand point since it eliminates the need for using CF and CB paper. See FIG. 2 for a schematic representation of a pile of adjacent cooperating CFB sheets of paper.

In order to prevent contamination of the microencapsulated dye by the adhesive or failure of the adhesive over storage conditions, it is necessary to mask the microcapsules with a resin 14. Any kind of film-forming resin which is inert to both the microencapsulated dye and the pressure sensitive adhesive can be used in this invention. Suitable examples of resins include, but are not limited to polyvinylalcohol, polyvinylacetate, polyacrylate, styrene butadiene latex, starch, carboxy methyl cellulose, gum arabic and printing inks. The resin can be applied by any method for forming film coatings such as, but not limited to, roll, dipping, gravure or rod coating. The thickness of the resin should be that suitable to mask the carbonless copying components from the adhesive. The actual thickness will depend upon the type of resin used and the coating method and will preferably range from about 5 μm to about 150 μm.

A note pad of stacked carbonless, repositionable self-adhesive paper can be made, for example, by coating a roll of CFB paper on the front surface (i.e., the color developer side) with a thin layer of polyvinylalcohol (from about 5 μm to about 50 μm in thickness). The paper roll is then coated on the back surface (the microencapsulated side) again with polyvinylalcohol, followed by a coating of repositionable adhesive (from about 5 μm to about 50 μm) on the same side. The roll of coated CFB paper is then cut and piled into jumbo paper pads. The jumbo pads can be further cut into smaller note pads. A specific example of the manufacture of the present invention is described below.

The note pad can be used to make multiple copies of a single message. The author of the message will preselect the number of copies desired by removing the corresponding number of note paper sheets from the stack. Writing pressure is then applied to create the message and the copies. Depending upon the desired use, the note pad can contain separator sheet(s) which is/are not carbonless that can be placed in between the stacked note paper sheets at predetermined intervals, to define a unit, whereby the unit can be removed from the stack and then used in a single copying event. For example, a unit can comprise a stack of two to five carbonless, repositionable sheets of note paper, where it is desired that the author make two to five copies of the message. This concept is useful for pre-made forms where repositionable copies of a desired number are needed.

Equivalents

Those skilled in the art will recognize or be able to ascertain, using no more than routine experimentation, many equivalents to the specific embodiments of the invention described herein. Such equivalents are intended to be encompassed by the following claims:

We claim:

1. A removable and repositionable pressure sensitive carbonless copying system comprising:

a) a first sheet of paper having front and back surfaces, said back surface comprising a layer of a carbonless copying component, a layer of resin coated on a portion of the copying component and a layer of a removable and repositionable pressure sensitive adhesive coated upon the resin, wherein the resin masks the coated portion of the carbonless copying component from the adhesive; and b) a second sheet of paper having front and back surfaces, said front surface comprising a layer of a carbonless image transfer material for cooperation with said carbonless copying component on said first sheet to enable an image to be transferred to said second sheet upon application of localized pressure to said first sheet, wherein said first sheet is temporarily adhered to said second sheet by said pressure sensitive adhesive component.

2. The pressure sensitive carbonless copying system of claim 1 wherein said pressure sensitive adhesive is an acrylate repositionable adhesive.

3. The pressure sensitive carbonless copy system of claim 1 wherein the resin is selected from the group consisting of polyvinylalcohol, polyvinylacetate, polyacrylate, styrene butadiene latex, starch, carboxy methyl cellulose, gum arabic and printing inks.

4. The pressure sensitive carbonless copying system of claim 1 wherein the front surface of the first sheet further comprises a layer of carbonless image transfer material.

5. The pressure sensitive carbonless copying system of claim 1 wherein the back surface of the second sheet further comprises a layer of carbonless copying material.

6. A removable and repositionable pressure sensitive carbonless copying system comprising:

a) a first sheet of paper having front and back surfaces, said back surface comprising a layer of a carbonless copying component, a layer of resin coated on a portion of the copying component and a layer of a removable and repositionable pressure sensitive adhesive coated upon the resin, wherein the resin masks the coated portion of the carbonless copying component from the adhesive;

b) at least one second sheet of paper having front and back surfaces, said front surface comprising a layer of a carbonless image transfer material for cooperation with the carbonless copying component of said first sheet and said back surface comprising a layer of a carbonless copying component, a layer of resin coated on a portion of the copying component and a layer of removable and repositionable pressure sensitive adhesive coated upon the resin, wherein the resin masks the coated portion of the carbonless copying component from the adhesive; and c) a third sheet of paper having front and back surfaces, said front surface comprising a layer of a carbonless image transfer material for cooperation with said carbonless copying component on the second sheet;

wherein said sheets of paper are temporarily adhered in a stacked configuration by said pressure sensitive adhesive.

7. The pressure sensitive carbonless copying system of claim 6 wherein said pressure sensitive adhesive is an acrylate repositionable adhesive.

8. The pressure sensitive carbonless copy system of claim 6 wherein the resin is selected from the group consisting of polyvinylalcohol, polyvinylacetate, polyacrylate, styrene butadiene latex, starch, carboxy methyl cellulose, gum arabic and printing inks.

9. The pressure sensitive carbonless copying system of claim 6 wherein there is a plurality of element (b) stacked between elements (a) and (c), wherein the plurality of element (b) includes an uppermost sheet in contact with element (a) and a bottom sheet in contact with element (c).

10. The pressure sensitive carbonless copying system of claim 6 wherein the front surface of the first sheet further comprises a layer of carbonless image transfer material.

11. The pressure sensitive carbonless copying system of claim 6 wherein the back surface of the third sheet further comprises a layer of carbonless copying component.

12. A writing system comprising a plurality of stacked sheets of carbonless copying paper, each sheet of paper having a front surface comprising a carbonless image transfer material and a back surface comprising a layer of a carbonless copying component, a layer of resin coated on a portion of the copying component and a layer of a removable and repositionable pressure sensitive adhesive coating thereon; wherein the carbonless image transfer material on the front surface of each sheet is in cooperation with said carbonless coating component on the adjoining sheet in the stack to enable an image to be transferred to the adjoining sheet upon application of localized pressure to the front surface, wherein said sheets are temporarily adhered together in the stack by said pressure sensitive adhesive.

13. The writing system of claim 12 wherein said pressure sensitive adhesive is an acrylate repositionable adhesive.

14. The writing system of claim 12 wherein the writing system is a note pad or multi-part business form.

15. The writing system of claim 12 wherein the resin is selected from the group consisting of polyvinylalcohol, polyvinylacetate, polyacrylate, styrene butadiene latex, starch, carboxy methyl cellulose, gum arabic and printing inks.

16. A method for making a removable and repositionable pressure sensitive carbonless copying system, comprising the steps of:

a) providing a sheet of carbonless copying paper having a front surface coated thereon with a carbonless image transfer material and a back surface coated thereon with a carbonless copying component;

b) coating at least a portion of said back surface with a resin;

c) coating the resin portion on the back surface of the sheet with a layer of removable, repositionable, pressure sensitive adhesive; and d) assembling a plurality of sheets obtained in step (c) into a stack such that the back surface of one sheet is in contact with the front surface of the adjoining sheet in the stack;

wherein said sheets are temporarily adhered together in the stack by said pressure sensitive adhesive, thereby forming the removable and repositionable pressure sensitive carbonless copying system.

17. The method of claim 16 further comprising on the front surface of each sheet, a layer of resin applied to the region on the surface that contacts the adhesive on the adjoining sheet.

18. The method of claim 16 wherein said pressure sensitive adhesive is an acrylate repositionable adhesive.

19. The method of claim 16 wherein the resin is selected from the group consisting of polyvinylalcohol, polyvinylacetate, polyacrylate, styrene butadiene latex, starch, carboxy methyl cellulose, gum arabic and printing inks.

20. The method of claim 16 wherein the sheets are stacked into a note pad or multi-part business form.

* * * * *